United States Patent [19]

Aitkenhead

[11] 3,830,314
[45] Aug. 20, 1974

[54] FLEXIBLE HARROWS

[76] Inventor: William Aitkenhead, Hollin Hall, Greenfield near Oldham, England

[22] Filed: June 15, 1972

[21] Appl. No.: 263,181

[30] Foreign Application Priority Data
June 26, 1971 Great Britain................... 30057/71

[52] U.S. Cl.................. 172/776, 172/439, 172/613
[51] Int. Cl....................... A01b 15/14, A01b 23/04
[58] Field of Search.......... 172/246, 247, 311, 439, 172/661, 662, 776, 245, 276, 277, 612, 613, 619, 624, 626, 629, 645, 646, 649, 657

[56] References Cited
UNITED STATES PATENTS

| | | | |
|---|---|---|---|
| 1,547,271 | 7/1925 | Toney | 172/276 |
| 1,852,212 | 4/1932 | Murphy | 172/662 X |
| 2,828,597 | 4/1958 | Moore | 172/662 X |
| 2,963,098 | 12/1960 | Kesselring | 172/624 X |
| 2,966,219 | 12/1960 | French | 172/311 X |
| 3,028,920 | 4/1962 | Wersterfer | 172/439 X |
| 3,508,618 | 4/1970 | Walberg | 172/776 X |
| 3,669,195 | 6/1972 | Green et al. | 172/311 |

FOREIGN PATENTS OR APPLICATIONS

| | | | |
|---|---|---|---|
| 608,113 | 9/1948 | Great Britain | 172/624 |
| 803,088 | 10/1958 | Great Britain | 172/776 |
| 482,747 | 6/1953 | Italy | 172/276 |
| 134,247 | 1/1952 | Sweden | 172/624 |
| 838,417 | 4/1970 | Canada | 172/662 |
| 683,357 | 11/1952 | Great Britain | 172/662 |

Primary Examiner—Robert E. Pulfrey
Assistant Examiner—Paul T. Sewell
Attorney, Agent, or Firm—Jordan Bierman

[57] ABSTRACT

A harrow drawing and transporting device attachable to a three point linkage at the rear of a tractor comprising a compound beam of two parallel single beams and having rotatable brackets so that by pivoting at the brackets the beam can be compounded in the vertical plane for harrow transporting or the horizontal plane for harrow drawing. The brackets extend to form fork arms which are disposed vertically when the harrows are being drawn from the device and are disposed horizontally to permit the harrows to be transported by the fork arms. The fork arms can be manipulated in the horizontal plane to make them ground contacting or ground clearing by operation of the three-point linkage.

6 Claims, 8 Drawing Figures

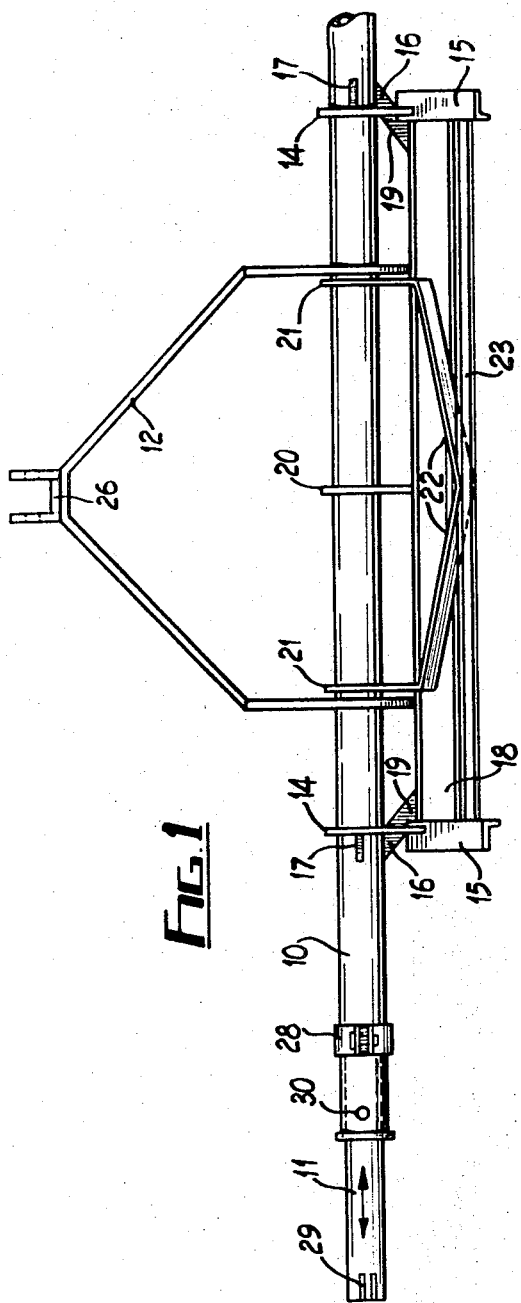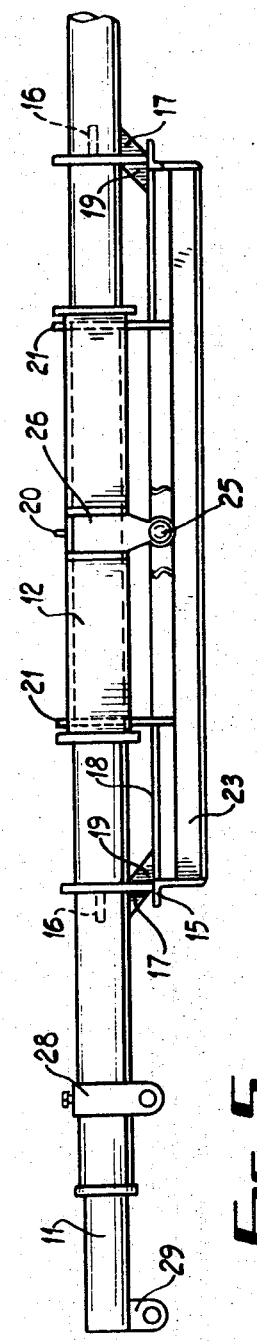

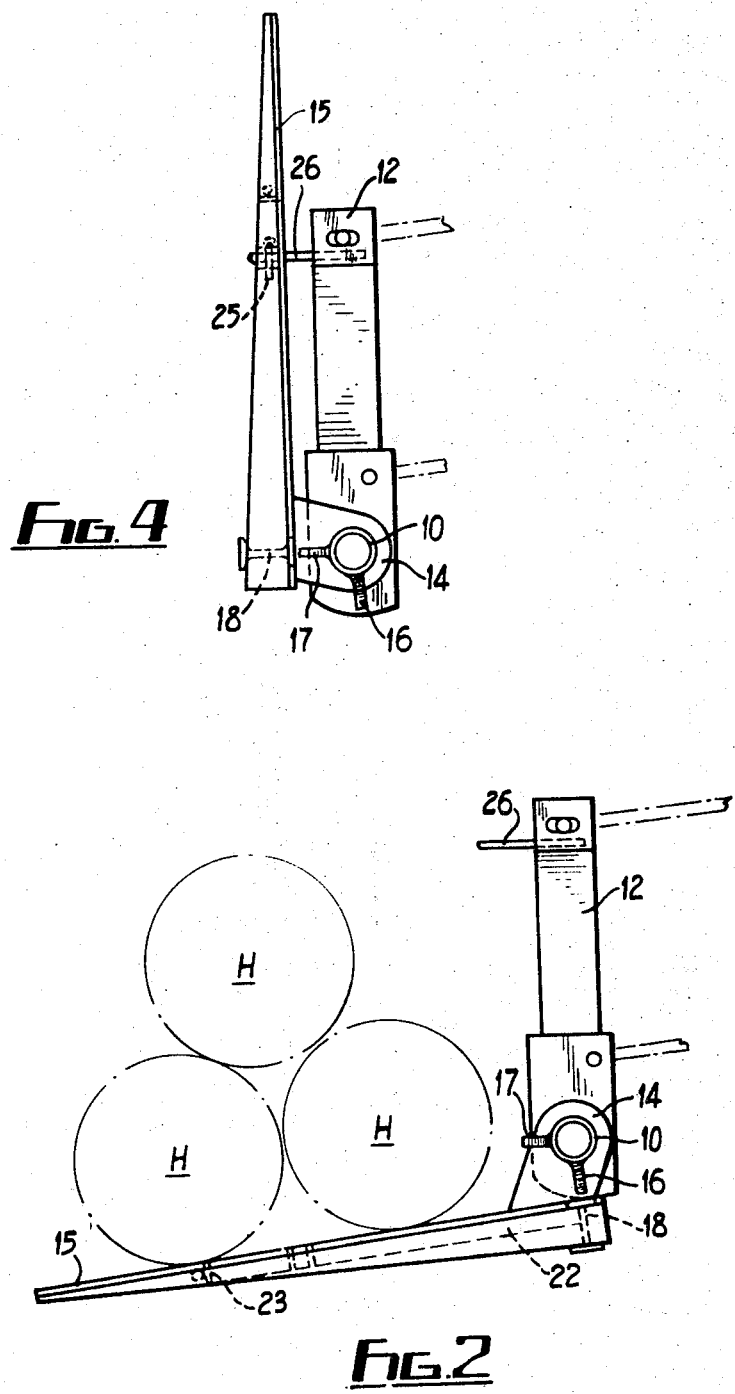

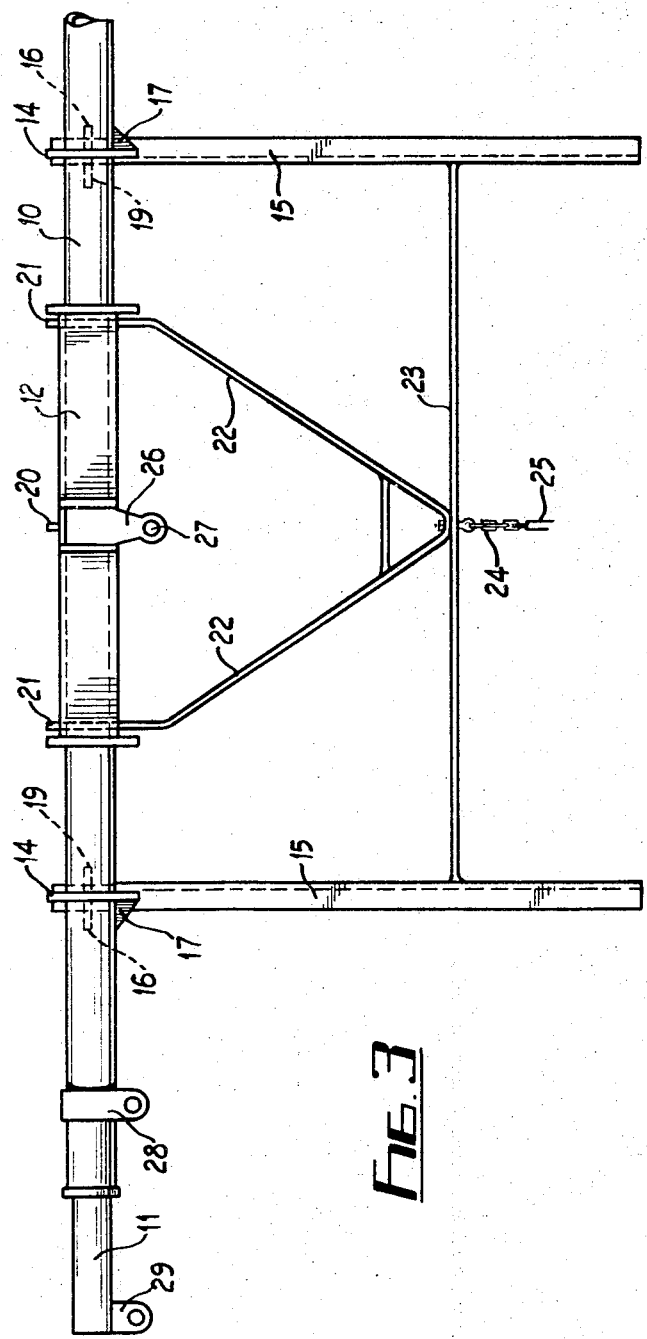

FLEXIBLE HARROWS

This invention concerns harrows and in particular, though not exclusively, the manner in which they can be transported from place to place for use.

The invention is applicable to harrows of the kind having rigid tine bearing frames and to flexible and chain harrows consisting of a plurality of interconnected links in the form of a mat. Generally one or more of the harrows are connected side by side to a harrow drawbar to form a set of harrows which are drawn across the ground to be harrowed.

To utilize the full power of the larger tractors it is common practise to connect two or three of such harrow drawbars with their attached harrows to a master whiffletree which is then connected to the tractor drawbar. It is found that such a master whiffletree operates at an optimum height of from 8 to 12 inches above ground level.

In any arrangement the need arises from time to time to transport the harrows from place to place and it is possible in some constructions of whiffletree to roll the harrow mats around their individual drawbars and then by lifting them onto a carrier to move them to a new location. In the case of the rigid units they can be stacked separately with their drawbar on such a carrier.

In the harrows to which brief reference has been made above, it is found there are several inherent disadvantages.

For example, the harrows whether they are of the rigid or flexible type are heavy to lift manually.

It is the object of the present invention to provide a master whiffletree which can be attached to the tractor to operate at approximately ten inches height and to at the same time provide a transportation means which serves a second and equally important function consisting in providing a reinforcement for the whiffletree and thus making it possible to cater for large width harrows to be drawn by a tractor without undesirable bending stress occurring in the whiffletree.

A further object of the present invention is to provide a harrow whiffletree in which the centres of the attachment points are adjustable so as to take wider sets of harrows and/or a greater number of sets of harrows when this becomes necessary.

According to the present invention there is provided a flexible harrow transporting device including a whiffletree having harrow attachment parts thereon, there being a pivotally mounted harrow mat transporting device secured to said whiffletree and including a beam adapted to reinforce the whiffletree to resist deformation either when the harrow is being used or transported.

Preferably the transporting device comprises at least two fork arms, adapted to receive rolled harrow mats or rigid sections, and a beam from which the fork arms extend, there being rigidly secured to the beam fillet elements adapted to co-operate with fillet elements of the whiffletree to produce, in either of two positions of the beam relative to the whiffletree, a compound beam.

Conveniently the beam extends across a central portion of the whiffletree and the latter is provided with outer sections telescopically mounted on the central portion, said co-operating fillet elements being positioned at least in the region of the ends of the central portion of the whiffletree.

The invention will now be described further, by way of example only, with reference to the accompanying drawings in which:

FIG. 1 is an elevation of part of a harrow transporting device made in accordance with the invention and in a position for receiving a harrow for transportation;

FIG. 2 is a side elevation of the device of FIG. 1.

FIG. 3 is a plan view of the device of FIG. 1;

FIG. 4 is a view similar to FIG. 2 with the device in the position assumed when a harrow is in use;

FIG. 5 is a plan view of the device when in the position shown in FIG. 4;

Figure 6:
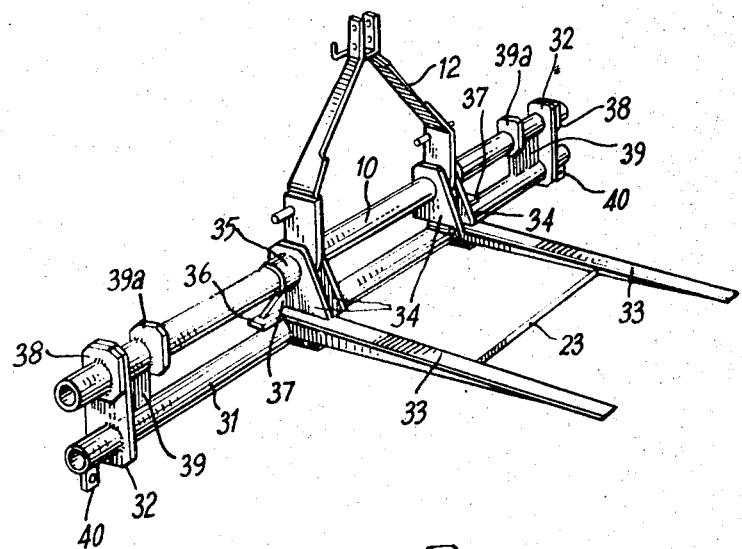
FIG. 6 is a perspective view of a modification of the harrow transporting device of FIGS. 1 to 5.

In the following description reference will be made primarily to flexible harrows but this does not limit the invention to use with such harrows only.

Referring first to FIGS. 1 to 5 it will be seen that the device comprises a whiffletree 10 in the form of a circular cross section hollow main beam 10 having at each end a telescopically mounted extension beam 11 (one only of such beams 11 is shown). Mounted centrally of the beam 10 is a frame 12 by means of which the whiffletree may be attached in known manner to the three point linkage (indicated in FIGS. 2 and 4 by the chain lines 13) of a tractor (not shown). The frame 12 is welded or otherwise rigidly fixed to the main beam 10. Adjacent the frame 12 and carried rotationally on the main beam 10 are brackets 14 to the outer ends of each of which is securely fixed a fork arms 15. Welded to the main beam 10 adjacent the brackets 14 are fillets 16 and 17 these being spaced apart 90° for a purpose referred to below.

Welded to the fork arms 15 adjacent the brackets 14 is a joist 18 which extends between the fork arms 15 and welded to the joist 18 and the brackets 14 are fillets 19. The fillets 19 lie on the opposite side of the brackets 14 to the fillets 16 and 17. The fillets 19 co-operate with the fillets 16 or 17 (depending upon the position of the fork arms) to provide, in effect, a reinforcing strut between the main beam 10 and the joist 18 so that the structure of beam 10, fillets and joist together act as a compound beam and thus collectively form an extremely strong unit with high resistance to bending.

A bracket 20 is mounted rotationally at the centre of the beam 10 and is welded to the joist 18 to provide additional strength and if desired fillets (not shown) can be secured to this bracket 20 and to the beam 10.

Two further rotatable brackets 21 are mounted on the beam 10 and these are formed integrally with reinforcing bars 22 which converge from the joist 18 towards a cross tie 23 mounted between the tines 15 intermediate their ends.

Secured to the cross tie 23 is a chain or cable 24 which has at its free end a peg 25. This peg 25 is provided to enable the tines 15 to be held in an inoperative position adjacent the frmame 12 when the harrows (not shown) are in use. For this purpose the frame 12 is provided, at its upper end with a lug 26 having at its end a hole 27 arranged to receive the peg 25.

Slidably mounted upon the main beam 10 are harrow attachments 28 which can be clamped to the main beam 10 at any desired position along its length between its extreme end and a bracket 14.

At the ends of the telescopically mounted extension beam 11 are provided fixed harrow attachments 29.

The main beam 10 is provided adjacent each end with a peg receiving hole 30 and each extension beam is provided with a series of spaced apart holes (not shown) so that the extension beams can be secured in any one of a series of extended positions relative to the ends of the main beam 10.

Figure 7:
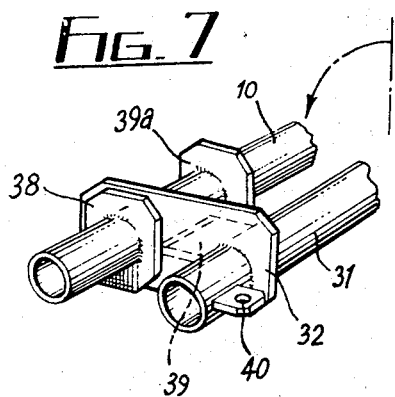
FIG. 7 is a detail of part of the device of FIG. 6.

Referring now to FIGS. 6 and 7 it will be seen that there is again provided a main beam 10 (extension beams like those of FIGS. 1 to 5 are also provided but are not shown) to which is secured a frame 12 like that of FIGS. 1 to 5.

In this construction however, there is provided a second beam 31 of tubular form and to this at positions adjacent its ends are welded main brackets 32 which are rotatable upon the main beam 10.

Figure 8:
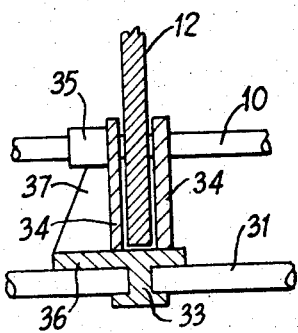
FIG. 8 is a detail of part of the device of FIG. 6.

At positions substantially in alignment with the frame 12 of the main beam 10 the second beam 31 are provided fork arms 33 like those of FIGS. 1 to 5 and mounted on these fork arms 33 are auxiliary brackets 34 there being one bracket at each side of each of the frame members 12. The outer brackets 34 are provided with bosses 35 through which the main beam 10 passes and welded to these bosses and to outwardly extending wings 36 of the fork arms 33 are fillets 37. As can be seen particularly from FIG. 8 the ends of the frame members 12 terminate just above the fork arms 33 between the outer brackets 34 so forming stops which bear upon the fork arms 33 when the latter are in their lowered position shown in FIG. 6.

On the ends of the main beam 10 are welded plates 38 against which the brackets 32 abut. Welded to the brackets 32 and to the second beam 31 are fillets 39 of rectangular form which terminate just clear of the main beam 10. These fillets 39 serve to strengthen the structure by substantially eliminating the possibility of bending in the main beam 10 and to provide means for preventing any relative axial movement between beams 10 and 31 a stop plate 39a is welded to the main beam 10 in a position such that the fillets 39 lie between the brackets 32 and the stop plates 39a. Harrow attachment lugs 40 are provided on the second beam 31, which serves as the whiffletree. As in the arrangement of FIGS. 1 to 5 there is provided a cross tie 23 between the fork arms 33 and this may have a peg and chain secured to it to enable the fork arms 33 to be held in position, when not in use, against the frame 12.

In use, with the harrows being towed behind the whiffletree the fork arms are held against the frame in an inoperative position. When it is desired to transport the harrows they are disconnected from the whiffletree and are rolled around their drawbar. The fork arms are lowered as shown in FIGS. 1, 2, 3 and 6 and the rolled harrows H are stacked onto the fork arms. By operating the three point linkage the whole assembly can be raised to lift the fork arms clear of the ground and thus the harrows H can be transported. If necessary a chain, rope or the like can be attached to the cross bar between the fork arms, passed over the harrows and secured to the frame 12 to prevent the harrows from falling off the fork arms.

Clearly if the extension beams 11 are extended they can be telescoped into the beam 10 in which they are carried to reduce the overall width of the whiffletree in order that the tractor can be driven through gates without the risk of the whiffletree ends fouling the gateposts.

It should be borne in mind that the apparatus described can be used with rigid harrows in which case when transportation is required the harrow sections are stacked upon the fork arms while the latter are as near to the ground as is possible. When the harrow sections are so stacked the fork arms are raised using power from the tractor and thereafter they can be transported.

I claim:

1. A harrow drawing and transporting device attachable to a three point linkage at the rear of a tractor, comprising:
   a. a frame for attaching said drawing and transporting device to said three point linkage;
   b. a first beam centrally and rigidly supported by said frame transverse to the line of movement of the tractor;
   c. spaced apart brackets rotatably mounted on said first beam;
   d. fork arms secured to said brackets so as to be pivotally mounted on said beam and to be movable from the horizontal to the vertical positions;
   e. a second beam substantially parallel to and spaced from said first beam, said second beam being fixedly mounted to the said fork arms at the pivoted ends of said fork arms;
   f. support fillets mounted on said first beam acting against said rotatable brackets;
   g. support fillets mounted on said second beam, said support fillets on both beams being relatively disposed so that compounding of the beams at the fillets takes place when the fork arms are in the horizontal or vertical positions; and
   h. means for trailing harrows from the compound beams so that when said fork arms are in the vertical position said first and second beams compound to act to reinforce each other in the horizontal harrow towing plane when said harrows are being towed and when said fork amrs are in the horizontal ground level position the first and second beams compound to act to reinforce each other in the vertical plane when said harrows are detached and loaded on the fork arms and then lifted clear of the ground by operation of the three point linkage.

2. The harrow drawing and transporting device specified in claim 1 wherein the support fillets, mounted on said first beam, comprise first and second fillets which are spaced 90° apart.

3. The harrow drawing and transporting device specified in claim 1 wherein the support fillets, mounted on said second beam, are fixedly secured to the rotatable brackets and to said second beam.

4. The harrow drawing and transporting device specified in claim 2 wherein the support fillets mounted on said second beam cooperate with either of the spaced fillets when the fork arms are vertical and with the other of the spaced fillets when the fork arms are horizontal.

5. The harrow drawing and transporting device specified in claim 1 wherein the support fillets mounted on said first beam are mounted on said rotatable brackets and fixedly mounted on said fork arms.

6. The harrow drawing and transporting device specified in claim 1 comprising a second plurality of brackets, said second brackets being fixedly mounted on said second beam and rotatably mounted on said first beam, the support fillets mounted on said second beam being fixedly mounted to said second beam and to each of said second brackets.

* * * * *